United States Patent
Lampin et al.

(10) Patent No.: US 8,450,687 B2
(45) Date of Patent: May 28, 2013

(54) INTEGRATED TERAHERTZ ANTENNA AND TRANSMITTER AND/OR RECEIVER, AND A METHOD OF FABRICATING THEM

(75) Inventors: Jean-François Fernand Lampin, Templeuve (FR); Emilien Pascal Peytavit, Lille (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 947 days.

(21) Appl. No.: 12/515,758

(22) PCT Filed: Nov. 21, 2007

(86) PCT No.: PCT/FR2007/001912
§ 371 (c)(1),
(2), (4) Date: Jun. 22, 2009

(87) PCT Pub. No.: WO2008/071863
PCT Pub. Date: Jun. 19, 2008

(65) Prior Publication Data
US 2010/0033709 A1 Feb. 11, 2010

(30) Foreign Application Priority Data

Nov. 21, 2006 (FR) ..................... 06 10164

(51) Int. Cl.
*G01J 3/28* (2006.01)
*H01Q 13/00* (2006.01)
(52) U.S. Cl.
USPC .................................................. 250/339.07
(58) Field of Classification Search
USPC .................................................. 250/339.07
See application file for complete search history.

(56) References Cited

U.S. PATENT DOCUMENTS 4,596,932 A * 6/1986 Buffa et al. .................. 250/374
6,323,818 B1 11/2001 Koh et al.

FOREIGN PATENT DOCUMENTS

WO WO 2006/011668 2/2006

OTHER PUBLICATIONS

Rebeiz Millimeter-wave and terahertz integrated circuit antennas, Proceedings of the IEEE, vol. 80, No. 11 (Nov. 1992), pp. 1748-1770.*
Smith et al. Development of a multi-layer Su-8 process for terahertz frequency waveguide blocks, 2005 IEEE MTT-S International Microwave Symposium Digest (Jun. 2005), pp. 439-442.*

(Continued)

*Primary Examiner* — David Porta
*Assistant Examiner* — Shun Lee
(74) *Attorney, Agent, or Firm* — Alston & Bird LLP

(57) ABSTRACT

An integrated antenna for transmitting or receiving radiation in a frequency range from 100 GHz to 3 THz, the antenna being characterized in that it comprises: a conductive ground plane (PM) deposited on a "top" surface (S) of a dielectric or semiconductor substrate (SB); a conductive ribbon (RC) extending above said ground plane (PM) and forming an angle (β) therewith, so as to form a radiating structure (SR) of the transverse electromagnetic wave horn type; and a planar waveguide (G) comprising at least first and second conductive strips (BS1, BS2) formed on said top surface of the substrate, and connected respectively to said conductive ribbon (RC) and to said conductive ground plane (PM). A terahertz transmitter and/or receiver including such an antenna and a device for generating and/or detecting a terahertz signal integrated on the same substrate (SB) as the antenna and connected thereto by said waveguide (G). A method of fabricating such an antenna and such a transmitter and/or receiver.

19 Claims, 4 Drawing Sheets

OTHER PUBLICATIONS

Bowen et al. Micromachined waveguide antennas for 1.6 THz, Electronics Letters vol. 42, No. 15 (Jul. 2006), pp. 842-843.*

Clark T-C Nguyen et al: "Micromachined Devices for Wireless Communications"; Proceedings of the IEEE, IEEE. New York, US; vol. 86, No. 8; Aug. 1998; XP011044074.

Yong-Kyu Yoon et al: "Surface-Micromachined Millimeter-Wave Antennas"; Solid State Sensors, Actuators and Microsystems 2005. Digest of Technical Papers. Transducers '05. The 13th International Conference on Seoul, Korea; Jun. 5-9, 2005; Piscataway, NJ, USA; IEEE; pp. 1986-1989; XP010828758.

* cited by examiner

INTEGRATED TERAHERTZ ANTENNA AND TRANSMITTER AND/OR RECEIVER, AND A METHOD OF FABRICATING THEM

CROSS REFERENCE TO RELATED APPLICATIONS

This application is a national stage application filed under 35 U.S.C. 371 of International Application No. PCT/FR2007/001912, filed Nov. 21, 2007, which claims priority to French Application No. 06 10164, filed Nov. 21, 2006.

FIELD AND BACKGROUND OF THE INVENTION

The invention relates to an integrated antenna for transmitting and/or receiving terahertz radiation, and to a transmitter and/or receiver device for terahertz radiation including such an antenna, and also to a method of fabricating said antenna and said device.

The term "terahertz" radiation covers electromagnetic radiation at a frequency lying in the range 100 gigahertz (GHz) to 3 terahertz (THz) approximately (1 THz=$10^{12}$ hertz (Hz)=1000 GHz). In a more restrictive sense, terahertz radiation is taken as being synonymous with submillimetric radiation, i.e. radiation having a wavelength lying in the range 100 micrometers (μm) to 1 millimeters (mm) approximately (approximate frequency lying in the range 300 GHz to 3 THz).

Terahertz radiation constitutes a spectral range intermediate between microwaves and infrared. Applications thereof were for a long time marginal or non-existent, but they are now in full expansion. Amongst those applications, the most important are spectroscopy and imaging for detecting pollution, for non-destructive inspection, and for medical diagnosis. In general, these applications make use of terahertz radiation propagating in empty space: it is therefore necessary to provide transmitters and receivers with antennas.

The antennas generally used at terahertz frequencies are planar antennas, typically of the dipole type (Hertz dipole), made monolithically on the substrate having the active components used for generating or detecting the radiation integrated thereon and including a hemispherical lens of silicon placed on the rear face of the substrate. Such antennas are described in particular in the document U.S. Pat. No. 5,789,750 and in the article by G. M. Rebeiz, "Millimeter-wave and terahertz integrated circuit antennas", Proceedings of the IEEE, Vol. 80, No. 11, p. 1748 (1992).

Those devices present numerous drawbacks.

Firstly, making the lens out of silicon and positioning it on the substrate with accuracy of micrometer order relative to the antenna is very difficult and expensive. Secondly, the use of a coupling lens is essential in order to prevent the radiation that is emitted mainly into the semiconductor substrate becoming trapped therein. In spite of the presence of such a lens, only about 21% of the power emitted by a planar type antenna is actually radiated into empty space, with the remainder being trapped and absorbed by the substrate.

Furthermore, the planar antenna in the most widespread use, a Hertz dipole, presents poor efficiency and, worse, its efficiency depends strongly on frequency. In spite of the fact that such antennas are not genuinely "broadband" antennas, they have nevertheless made it possible to obtain the best results so far in pulse terahertz spectroscopy. However their poor efficiency makes them unsuitable for use under continuous conditions, where the powers involved are very small.

Document U.S. Pat. No. 4,855,749 describes a planar antenna of the Vivaldi type made on a silicon substrate, operating in the terahertz range and not requiring a coupling lens. The results obtained with the help of such an antenna are not entirely satisfactory, in particular from the points of view energy efficiency and large dispersion of pulses.

Document US 2006/0152412 describes a planar antenna in the form of a logarithmic spiral. Such an antenna presents relatively good efficiency and is a broadband antenna, but it is highly dispersive. Consequently, it is not suitable for use under pulse conditions.

The article by V. Lubecke et al., "Micromachining of terahertz applications", IEEE Trans. on Microwave Theory and Tech., Vol. 46, No. 11, p. 1821 (1998) relates to integrated antennas for terahertz systems made with the help of microtechnology techniques and overcoming the limitations of planar structures. Nevertheless, the solutions provided by those methods are not satisfactory because of the cost and the complexity of the fabrication methods and because of the fragility of the resulting structures. In addition, the techniques used (deep etching, dielectric membrane, etc.) are appropriate essentially for silicon, a material that is not particularly suitable for terahertz applications.

SUMMARY OF THE INVENTION

An object of the invention is to remedy at least some of the drawbacks of the prior art.

In particular, an object of the invention is to provide an antenna for transmitting or receiving terahertz radiation that presents greater efficiency than the planar antennas presently in use.

Another object of the invention is to provide a terahertz antenna that is easy and inexpensive to fabricate, even in mass production.

Another object of the invention is to provide a terahertz antenna that is very broadband and that presents little dispersion. Such an antenna can be suitable for use under pulse conditions using pulses that are very short (picoseconds), and also under continuous conditions, possibly tunable conditions.

Yet another object of the invention is to provide a monolithic transmitter and/or receiver for terahertz radiation that integrates such an antenna and at least one device for generating and/or detecting radiation.

Yet another object of the invention is to provide a spectrometer capable of operating equally well under pulse conditions and under continuous conditions, and also a gas analyzer based on such a spectrometer.

At least one of these objects is achieved by an integrated antenna for transmitting or receiving radiation in a frequency range of 100 GHz to 3 THz, the antenna being characterized in that it comprises: a conductive ground plane deposited on a "top" surface of a dielectric or semiconductor substrate; a conductive ribbon extending above said ground plane and forming an angle therewith, so as to form a radiating structure of the transverse electromagnetic wave horn type (TEM horn type); and a planar waveguide comprising at least first and second conductive strips formed on said top surface of the substrate, and connected respectively to said conductive ribbon and to said conductive ground plane.

In particular embodiments of the invention:
  Said conductive ribbon and its distance from said ground plane may vary in a longitudinal direction, the ratio between said width and said distance being selected so as to achieve impedance matching between said planar waveguide and the radiating structure formed by the ribbon and the ground plane; more particularly, this ratio may be kept constant over at least a fraction of the length of said conductive ribbon.

Still more particularly, the width of said conductive ribbon and its distance from said ground plane may increase linearly along said longitudinal direction; in other words, said conductive ribbon may be substantially triangular in shape with a half-angle at the apex lying in the range 5° to 70°.

The angle between said conductive ribbon and said ground plane preferably lies in the range 5° to 45°.

Said planar waveguide may also include a third conductive strip also connected to said ground plane, the second and third conductive strips being disposed symmetrically on either side of said first conductive strip.

Said conductive ribbon extending above said ground plane and forming an angle relative thereto may present a length lying in the range 100 µm to 10 mm, and preferably in the range 500 µm to 5 mm.

The antenna may also include at least one spacer for holding said conductive ribbon spaced apart from said ground plane.

The invention also provides a terahertz transmitter comprising: an antenna as defined above; and at least one generator device for generating an electromagnetic signal at a frequency lying in the range 100 GHz to 3 THz, and integrated on the same dielectric or semiconductor substrate as the antenna; the planar waveguide of the antenna being arranged to convey said electromagnetic signal from the generator device to the radiating structure formed by the ribbon and the ground plane.

The invention also provides a terahertz receiver comprising: an antenna as defined above; and at least one detector device for detecting an electromagnetic signal of frequency lying in the range 100 GHz to 3 THz, integrated on the same dielectric or semiconductor substrate as the antenna; the planar waveguide of the antenna being arranged to convey said electromagnetic signal from the radiating structure formed by the ribbon and the ground plane to the detector device.

The invention also provides a terahertz spectrometer comprising: a terahertz radiation transmitter as described above, of the photoconduction type; a terahertz radiation receiver as described above, likewise of the photoconduction type, arranged to receive terahertz radiation generated by said transmitter after the radiation has passed through a region suitable for containing a sample for analysis; a first laser source for generating pulses; second and third laser sources for generating continuous radiation, at least one of them being tunable, the frequency difference between the radiation emitted by said second and third sources being capable of varying within a range from 100 GHz to 3 THz; and an optical setup for selectively directing either the radiation emitted by said first laser source, or a superposition of the radiation emitted by said second and third laser sources onto photoconductive zones of said transmitter and receiver; said optical setup including a delay line for introducing a variable time offset between the laser pulses emitted by said first source and directed to a photoconductive zone of said transmitter, and laser pulses likewise emitted by said first laser source and directed towards a photoconductive zone of said receiver.

The invention also provides a method of fabricating an antenna as defined above, the method comprising the following steps:

fabricating a ground plane and a planar waveguide presenting at least two conductive strips, one of which is connected to said ground plane, by depositing a first layer of metallization on a "top" surface of a dielectric or semiconductor substrate;

depositing a sacrificial layer on said ground plane;

fabricating a conductive ribbon connected to at least one other conductive strip of said waveguide by depositing a second layer of metallization on said sacrificial layer; and etching said sacrificial layer to release said conductive ribbon.

In particular implementations:

The method may also include, prior to depositing said layer of metallization, a step of making openings in said sacrificial layer to enable electrical and mechanical connections to be made between the conductive ribbon and said other conductive strip of said planar waveguide.

Said second layer of metallization may form said conductive ribbon presents thickness lying in the range 0.1 µm to 50 µm, and preferably in the range 1 µm to 10 µm.

The method may also include a step of lifting said conductive ribbon.

The method may also include a step of fabricating a spacer to hold said conductive ribbon spaced apart from said ground plane. In particular, this step may comprise depositing a droplet of wax in the liquid state between the conductive ribbon and the ground plane, and then hardening it.

The method may also include a step of integrating on said dielectric or semiconductor substrate a device and/or for generating and/or detecting an electromagnetic signal of frequency lying in the range 100 GHz to 3 THz, said device being connected to the radiating structure formed by the ribbon and the ground plane by said planar waveguide.

BRIEF DESCRIPTION OF THE DRAWINGS

Other characteristics, details, and advantages of the invention appear on reading the following description made with reference to the accompanying drawings, given by way of example and, in which.

MORE DETAILED DESCRIPTION

Whereas the integrated antennas that operate in the terahertz range and that are known in the prior art are mainly of the planar type, the invention relates to a three-dimensional antenna made on an insulating or semiconductor substrate using standard photolithographic techniques. More precisely, the antenna is of the transverse electromagnetic wave horn type, i.e. it is constituted by a flared waveguide made up of two superposed conductive sheets separated by an angle $\beta$.

Figure 1:
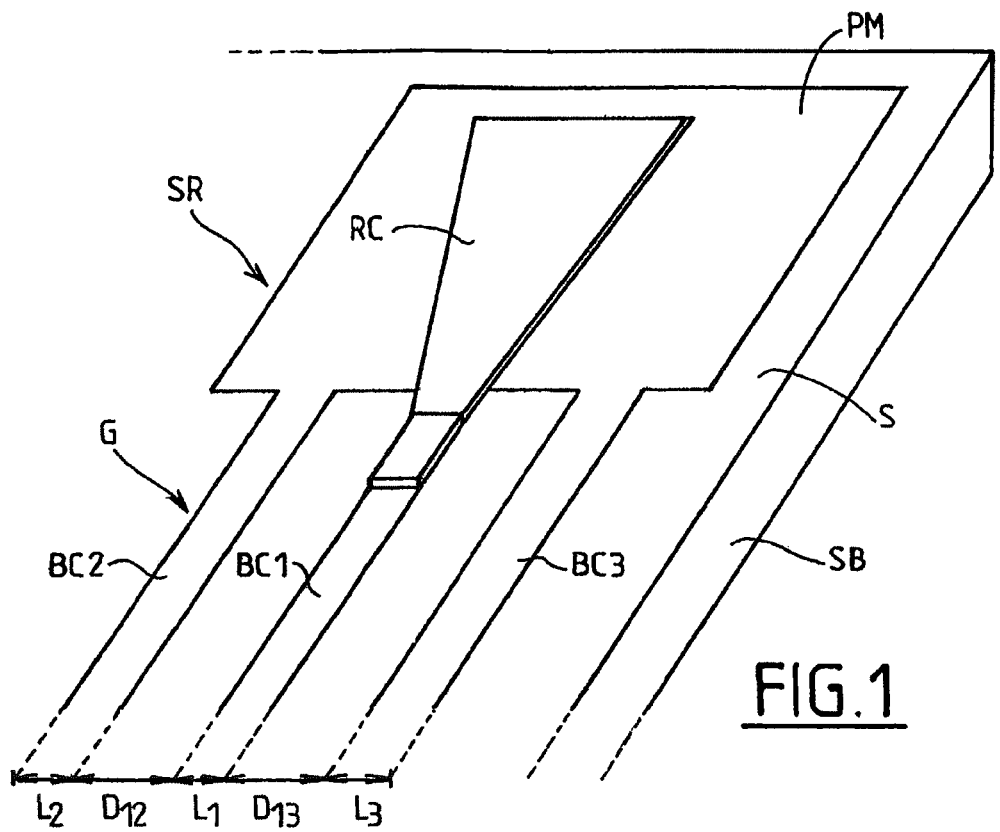
FIGS. 1, 2, and 3 are respectively an elevation view, a side view, and a plan view of an integrated antenna of the invention.
Figure 2:
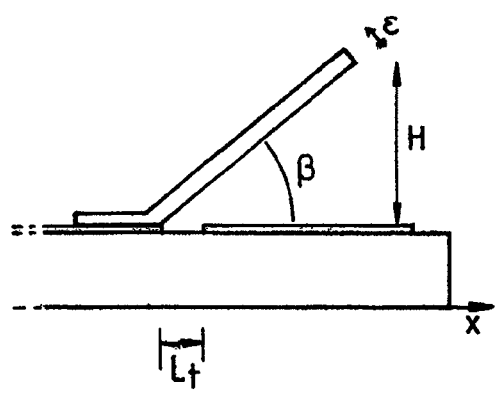
Figure 3:
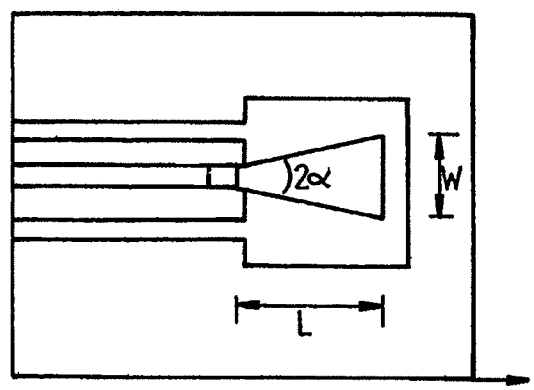

In the embodiment shown in FIGS. 1 to 3, the two conductive sheets constituting the transverse electromagnetic wave horn comprise a ground plane PM deposited on a surface S of an insulating or semiconductor substrate SB, and a conductive ribbon RC extending above said ground plane and forming an angle β therewith. The ribbon RC is substantially plane and of triangular shape with an angle at the apex of 2α. The ground plane PM and the ribbon RC form a waveguide of impedance that is constant along the longitudinal direction x and that depends on α and β only. In the example under consideration, α=23.4° and β=9.8° for a total ribbon length L=3 mm, thereby giving a characteristic impedance close to 50 ohms (Ω), a total height H=520 μm, and a width W=2.6 mm at the end of the ribbon.

The characteristic impedance may be calculated by the following approximate formula that is valid when W>H and for a dielectric having permittivity equal to 1:

$$Z_C \approx \frac{120\pi}{\frac{W}{H}+2} = \frac{60\pi}{\frac{\tan\alpha}{\sin\beta}+1}$$

The above formula gives good results with angles α and β of less than 50°. More general calculation methods and charts can be found in R. T. Lee et al., IEEE Transactions on Antennas and Propagation, Vol. 52, p. 315 (2004).

In principle, the angles α and β may have any value lying in the range 0° to 90°, not including the limit values. Nevertheless, the angle α preferably lies in the range 5° to 70°, and the angle β in the range 5° to 45°.

The length of the ribbon RC is an important parameter since it determines the low cutoff frequency of the antenna. This length generally lies in the range 100 μm to 10 mm, and preferably in the range 500 μm to 5 mm.

The high cutoff frequency depends on the smallest geometrical scale for which the antenna continues to be a geometrical figure of constant shape. If the ribbon RC were perfectly triangular and connected to the planar waveguide G by its tip, then its bandwidth would be theoretically infinite (in practice limited solely by the intrinsic physical properties of the materials used). In a structure that can be made in practice, the high cutoff frequency is determined essentially by the finite width of the connection between the ribbon RC and the waveguide G.

The shape of the conductive ribbon RC need not be triangular, for example its width W could depend in non-linear manner on its longitudinal coordinate x. In addition, the ribbon RC need not be plane, but it could present curvature or warping: as discussed in greater detail below, a small amount of curvature is difficult to avoid in practice because of internal stresses that accumulate during fabrication of the device. Nevertheless, if it is desired to obtain a broadband antenna, the radiating structure SR needs to present the same geometrical shape at all scales; in other words, the width over height ratio $W(x)/H(x)$ must remain constant as far as possible. In order to maintain this ratio $W(x)/H(x)$ substantially constant and thus obtain broadband operation, even in the presence of warping induced by the internal stresses, it is possible to select a ribbon RC that is of generally triangular shape but with sides that are curvilinear in order to keep this ratio $W(x)/H(x)$ substantially constant.

The ribbon RC is made of a highly conductive material (gold, copper, . . . ) with a thickness ∈ of the order of at least a few micrometers, e.g. 5 μm, in order to provide sufficient strength. The structure can be made more solid by means of dielectric or even arms or spacers holding the ribbon RC spaced apart from the ground plane PM. A particularly effective technique consists in stabilizing the ribbon with the help of a drop of molten paraffin wax: such a material is suitable for terahertz applications because of the small losses it introduces and because of its relatively low refractive index, of about 1.5.

The radiating structure formed by the ribbon RC and the ground plane PM is connected to a planar waveguide G made up of three conductive strips: a first strip BS1 is connected to the ribbon RC and carries the signal for transmission or the received signal, while second and third strips BS2 and BS3 disposed symmetrically on either side of the first strip are connected to the ground plane PM. It is possible to consider that the ribbon RC is an extension of the first strip BS1, and that the ground plane PM is constituted by enlarging and uniting the second and third strips. It will be understood that it is advantageous for the characteristic impedance of the waveguide G to be substantially equal to that of the radiating structure RS so as to avoid reflection losses at the transition between the two structures.

In the example described, all three strips are of the same width $L_1=L_2=L_3=10$ μm, being spaced apart at distances $D_{12}=D_{13}$ of 6 μm between each of the side strips BS2, BS3, and the center strip BS1. The total width of the waveguide G should be as small as possible in order to minimize radiation losses.

The length $L_t$ between the point where the ribbon RC separates from the surface S and the rear side of the ground plane PM is another parameter that needs to be optimized so as to minimize reflection losses at the transition between the waveguide G and the radiating structure RS. In principle, this length should be as short as possible while remaining compatible with fabrication constraints and with the need to avoid any direct electrical contact between the ribbon RC and the ground plane PM. In the example described, $L_t$ is selected, very prudently, as being equal to 20 μm. Better results can be obtained by using a separation length of a few micrometers, e.g. $L_t$=5 μm.

The substrate SB is made of a dielectric or semiconductor material, preferably presenting losses that are relatively low in the spectral range of interest, and presenting a refractive index that is as low as possible in order to minimize the effect of radiation trapping. Examples of suitable substrates are semi-insulating AsGa (used in the example of FIGS. 4 to 6), Si, IP, SiC, quartz, diamond, glass, etc. In practice, the choice of substrates is associated firstly with technological considerations and secondly with the need to integrate on the same substrate at least one active element for generating and/or detecting terahertz radiation. The active element may be a photodetector, a photodiode, a PIN diode, a resonant tunnel effect diode, a Schottky contact diode, etc., which requires the substrate SB to be of the semiconductor type; it may also be merely a thin layer of semiconductor material biased by metal electrodes, in particular when using a photoconductive generator or a Franz-Keldysh effect detector, it then being possible to use a substrate that is substantially insulating, e.g. being made of quartz or glass.

A remarkable aspect of the invention is that the radiation is launched directly into air and not into the substrate: that is why there is no need to use a coupling lens. Furthermore, the importance of the properties of the substrate (dielectric constant, losses, . . . ) is smaller than it is with prior art devices, thereby leaving the designer with more room to maneuver when selecting the material that is most suited from the technological point of view and/or for making active elements.

At first sight, the antenna of the invention resembles the antenna described in the article by J-C. Langer et al., "Micromachined reconfigurable out-of-plane microstrip patch antenna using plastic deformation magnetic actuation", IEEE Microwave and Wireless Component Letters, Vol. 13, No. 3, p. 120 (2003). That antenna presents a radiating structure formed by a conductive plate of substantially rectangular shape that extends over the top surface of a dielectric substrate while forming an angle relative thereto, and a conductive ground plane deposited on the bottom surface of the same substrate. The plate on the top surface and the ground plane on the bottom surface are in fact extensions of a microstrip transmission line conveying signals to the antenna. Properly speaking, that antenna is not of the horn type, but rather it constitutes a variant of a microstrip antenna. As a result it presents a relatively narrow band, of the order of 5% centered on 25 GHz to 28 GHz, i.e. frequencies that are remote from the terahertz domain. Furthermore, as in any microstrip antenna, the substrate contributes to the radiation, which is not an impediment in the spectral range under consideration (centimeter wave), but which would lead to very high losses and a marked guiding effect on the transmitted waves if an attempt were made to use a microstrip antenna at terahertz frequency.

Figure 4:
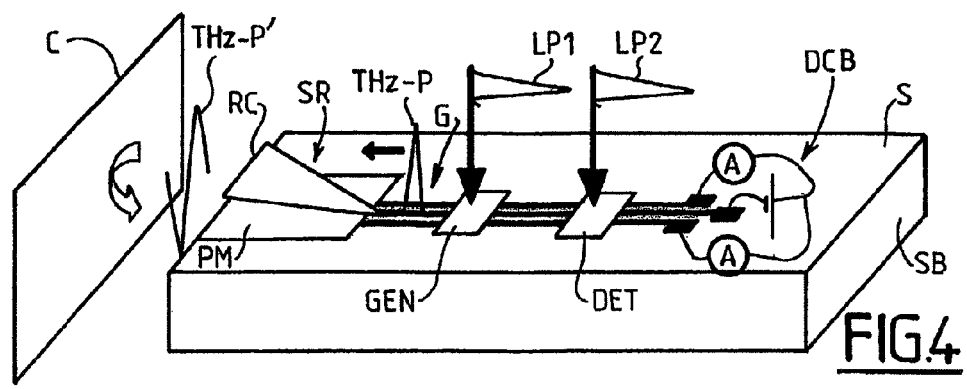
FIG. 4 is a diagram of an experiment for demonstrating the operation of an antenna and a transmitter and/or receiver device of the invention.

FIG. 4 is a diagram of a monolithic transmitter and/or receiver system of the invention of the photoconduction type. Such a system is constituted by an antenna of the above-described type, an active device GEN for generating terahertz radiation, and an active device DET for detecting terahertz radiation, said devices being connected to the radiating structure SR by the planar waveguide G. In a demonstrative experiment, the system of FIG. 4 has been used as a monostatic radar for measuring the distance between the antenna and a reflecting target C situated at a distance of a few millimeters therefrom.

The generator device GEN is constituted merely by a layer of GaAs growth epitaxially at low temperature and deposited on the conductive strips BS1, BS2, and BS3 of the waveguide G and biased by a DC voltage of 60 volts (V) applied between BC1 and BC2/BC3 by a DC generator DCB. Under equilibrium conditions, the GaAs film is substantially insulating; a laser pulse LP1 with a duration of 120 femtoseconds (fs) and a wavelength of 810 nanometers (nm) as generated by a Ti:Sapphire laser makes it conductive for a period of time of the order of 1 picosecond (ps), i.e. the lifetime of the charge carriers; this sudden change in conductivity generates a unipolar electric current pulse THz-P that also has a duration of the order of 1 ps, and thus presents a spectrum that extends up to terahertz frequencies. This pulse THz-P propagates along the waveguide G and is radiated into empty space by the horn SR. It can be seen that even though the guided pulse THz-P is unipolar, the radiated pulse THz-P' is not, which is a well known consequence of the laws of electromagnetism.

The generator GEN is connected to the ground plane PM via two $Si_3N_4$-based capacitors (not shown) that interrupt the strips BS2, BS3. If the bias voltage were to be applied directly between the ribbon RC and the ground plane PM, an electrostatic force would act between those two elements and might move them towards each other.

The pulse THz-P' propagates in empty space to the target C, constituted by a conductive plane, which reflects the pulse back towards the antenna. The reflected pulse is detected optically with the help of a detector DET constituted by a layer of $Al_{0.08}Ga_{0.92}As$ that is deposited on the conductive strips BS1, BS2, and BS3 of the waveguide G. A laser pulse LP2, a time-offset replica of the generating pulse LP1, is directed towards said layer and is reflected in part; because of the Franz-Keldysh effect, the reflection coefficient depends on the instantaneous electric field in the detector, as given by superposing the DC bias voltage and the terahertz signal. By varying the time delay between the generating laser pulse LP1 and the detection pulse LP2, the pulse THz-P' as reflected and picked up by the antenna can therefore be sampled with sub-picosecond time resolution, on the pump-probe principle.

The techniques for generating and detecting terahertz pulses in this experiment are described in greater detail in the following articles:

J-F. Lampin et al., "Detection of picosecond electrical pulses using the intrinsic Franz-Keldysh effect", Appl. Phys. Lett. 78, 4103 (2001); and L. Desplanque et al., "Generation and detection of terahertz pulses using post-processing bonding of low-temperature-grown GaAs and AlGaAs", Appl. Phys. Lett. 82, 2049 (2004).

In a variant, it is possible to generate continuous terahertz radiation. To do this, instead of using the laser pulse LP1, two continuous laser beams are used that present a frequency difference equal to the frequency of the radiation that is to be generated. This technique which makes use of beats between the two laser beams is known as "photomixing generation" and it is described in the article by E. R. Brown, K. A. McIntosh, K. B. Nichols, and C. L. Dennis, "Photomixing up to 3.8 THz in low-temperature-grown GaAs", Applied Physics Letters, Vol. 66, p. 285 (1995).

Photomixing can also be used for detecting terahertz radiation using a technique known as homodyne detection: see the article by G. Mouret, S. Matton, R. Bocquet, D. Bigourd, F. Hindle, A. Cuisset, J-F. Lampin, and D. Lippens, "Anomalous dispersion measurement in terahertz frequency region by photomixing", Applied Physics Letters, Vol. 88, 181105 (2006).

In a variant, continuous terahertz radiation can be detected with the help of a bolometer.

Figure 5:
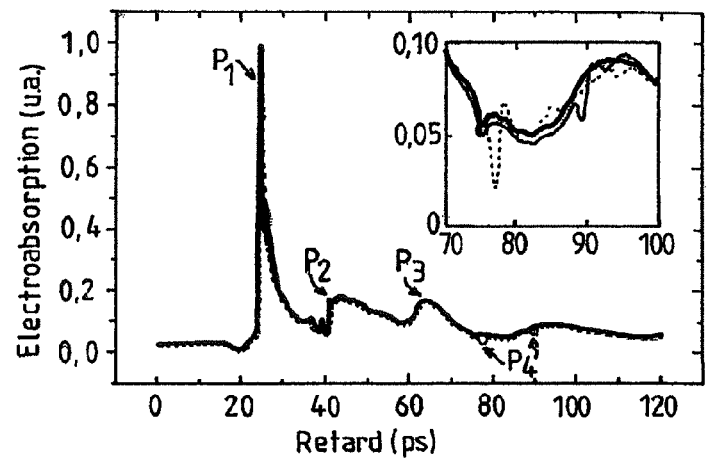
FIGS. 5 and 6 are graphs illustrating the results of the experiment.

FIG. 5 shows the electroabsorption signal (in arbitrary units a.u.) of the probe impulse LP2 as a function of the pump-probe delay (in ps). The first peak $P_1$ corresponds to the electrical terahertz pulse THz-P conducted directly by the waveguide G from the generator GEN to the detector DET: the peaks $P_2$ and $P_3$ correspond to interfering reflections from the waveguide-horn transition G-RS and from the end of the horn, respectively, while the peak $P_4$ does indeed correspond to the pulse THz-P' as transmitted, reflected, and detected. The enlarged box shows a detail of the peak $P_4$ for two positions of the target C: 5.5 mm (dotted line) and 7.5 mm (continuous gray line) from the end of the horn, and also in the absence of the horn (continuous black line). The sub-picosecond rise time of the peak $P_4$ (from 10% to 90% in about 700 fs) demonstrates the low dispersion of the antenna of the invention. Such low dispersion is characteristic of transverse electromagnetic wave horn antennas.

Figure 6:
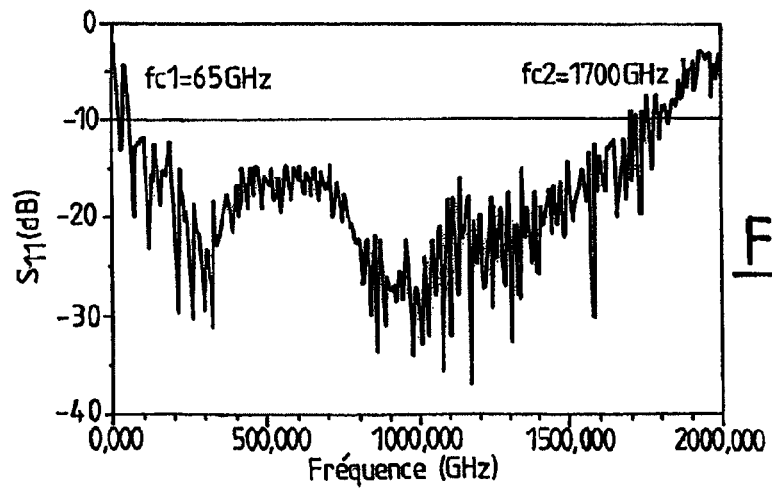

By dividing the Fourier transform the reflected pulse by the Fourier transform of the incident pulse, it is possible to obtain the coefficient of reflection of the antenna as a function of frequency: $|S_{11}(f)|$. As shown in FIG. 6, this reflection coefficient is less than −10 decibels (dB) over a band extending from 65 GHz to 1700 GHz (1.7 THz) approximately, demonstrating the ultra-broadband operation of the antenna of the invention.

Losses attributable to propagation along the waveguide G are estimated at 4 dB for frequencies up to 800 GHz and may be reduced at a future date by selecting a substrate with lower dielectric permittivity, such as quartz.

Figure 7A:
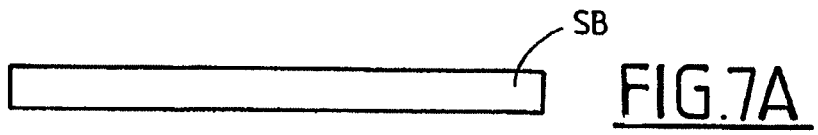
FIGS. 7A to 7G show the steps of a method of fabricating the antenna of FIGS. 1 to 3.
Figure 7B:
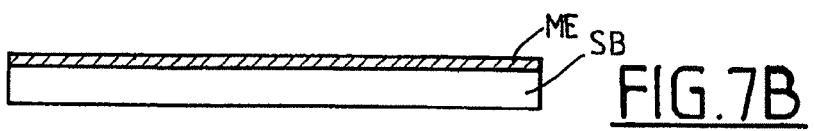
Figure 7C:
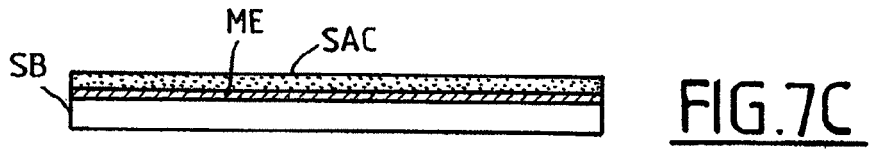
Figure 7D:
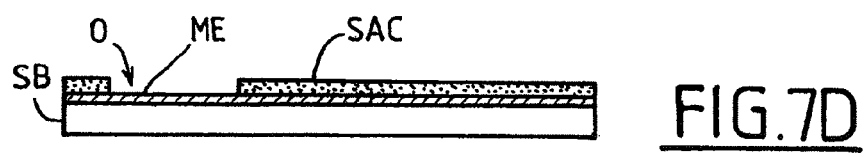
Figure 7E:
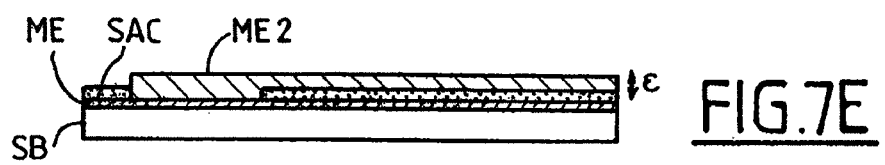

FIGS. 7A to 7G show various steps in a method of fabricating an integrated antenna of the invention. Firstly, FIGS. 7A to 7B show a first metal layer ME being deposited on the substrate SB and etched by conventional microelectronics techniques so as to make the conductive strips BS1-BS3 of the waveguide G and the ground plane PM. Thereafter, FIG. 7C shows the metal layer ME being covered by a sacrificial layer of photosensitive resin, having openings O formed therein in the locations of the future electrical and mechanical connections between the conductive ribbon RC and the center conductive strip BS1. A second metal layer ME2 that is substantially thicker than the first layer ME is deposited on the sacrificial layer SAC (FIG. 7E) to form the conductive ribbon RC. The thickness ∈ of the layer ME2 is determined empirically. This thickness needs to be sufficient both to ensure that the ribbon RC is sufficiently strong once it is no longer supported by the substrate and to avoid stresses internal to the layer ME2 imparting excessive curvature thereto, where such curvature is inversely proportional to the thickness c. Simultaneously, a certain amount of curvature is found to be essential for ensuring that the antenna is released: a layer ME2 that is too thick would adhere to the ground plane ME and would thus prevent the ribbon RC being raised.

Figure 7F:
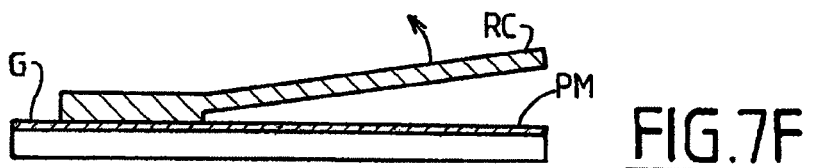
Figure 7G:
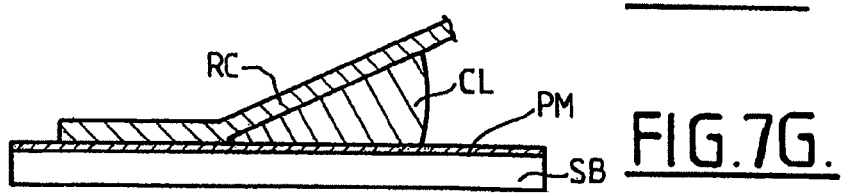

Finally, as shown in FIG. 7F, the ribbon RC is released by under etching said sacrificial layer SAC. The above-mentioned internal stresses then cause the ribbon RC to be raised as soon as it has been released. Nevertheless, in general, it does not rise sufficiently to reach the desired angle β; it is therefore necessary to act on the ribbon RC, e.g. with the help of a micromanipulator. Optionally, it is possible to provide an additional step of stabilizing the radiating structure SR, in particular by depositing a droplet of liquid paraffin between the ground plane PM and the conductive ribbon RC; on solidifying, the droplet forms a dielectric spacer CL that stiffens the antenna (FIG. 7G).

Figure 8:
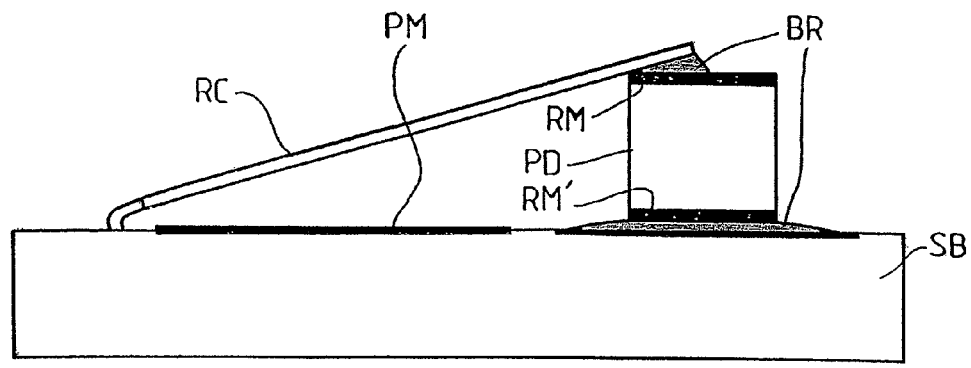
FIG. 8 is a section view of an antenna in another variant of the invention.

In a variant, as shown in FIG. 8, the structure of the antenna may be supported by a dielectric pad PD such as a cube of polytetrafluoroethylene (PTFE) placed between the ground plane PM and the conductive ribbon RC and fastened by adhesive or brazing; when using brazing, a metal coating RM, RM', e.g. made of copper, needs to provided on the top and/or bottom surface(s) of the pad. Even when using adhesive, such a coating can be useful in separating the terahertz radiation from the adhesive, which would otherwise run the risk of giving rise to large losses. The use of brazing BR is found to be particularly advantageous. When the molten metal solidifies, it gives rise to tension in the conductive ribbon RC, thereby straightening it and thus improving the electromagnetic properties of the antenna. Nevertheless, even when a spacer of the above type is used, it can be useful to fill the space between the ground plane and the conductive ribbon with wax so as to make electrical permittivity uniform in said space.

The active device(s) for generating and/or detecting terahertz radiation may be fabricated at the same time as the antenna, possibly in common with some of the steps of the fabrication method (in particular the metallization step). In a variant, these devices may be fabricated before or after the antenna.

One of the most promising applications for terahertz radiation is spectrometric analysis, in particular of gas, e.g. in order to identify pollution. In particular, two spectrometry techniques can be used.

A first possibility consists in using terahertz pulses that are short, and therefore broadband, so as to perform spectroscopic measurements by Fourier transform. This technique is fast, but presents poor spectral resolution (typically of the order of a few GHz). Typically, dipole antennas are used for this type of application.

Another possibility consists in using tunable continuous terahertz radiation obtained by using the photomixing technique as described above. The low power of the terahertz radiation obtained in this way has made it necessary to use spiral antennas or the like. This technique makes it possible to perform spectroscopic measurements at high resolution (a few MHz or even less), but scanning large frequency ranges requires long times.

The antenna of the invention presents electromagnetic characteristics suitable for transmitting and receiving terahertz pulses, and also tunable continuous radiation. This makes it possible to provide a spectrometer that combines the advantages of both of the above-described techniques.

Figure 9:
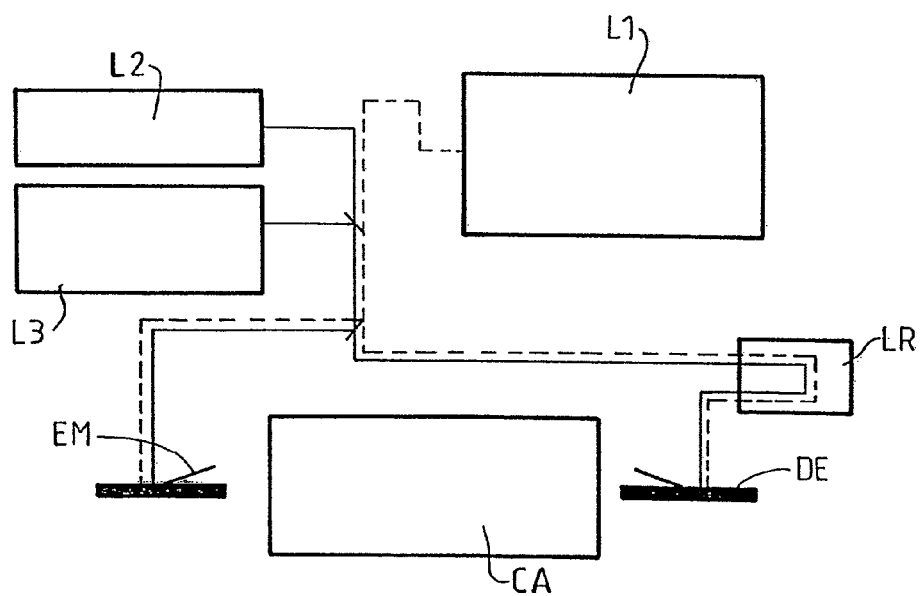
FIG. 9 is a block diagram of a terahertz spectrometer based on using antennas of the invention.

Such a spectrometer, of structure shown diagrammatically in FIG. 9 comprises:
  a terahertz transmitter EM, e.g. of the type shown in FIG. 4;
  a terahertz detector DE that may likewise be of the type shown in FIG. 4;
  an analysis cell CA for containing a sample (typically a gas) for analysis, said cell being disposed between the transmitter and the detector;
  a pulse laser source L1;
  two continuous laser sources L2 and L3, at least one of which is tunable; and
  an optical setup for selectively directing laser radiation generated by said pulse laser source, or by said continuous laser sources onto a photoconductive element of said terahertz transmitter and detector. The optical setup for the detector includes a delay line LR.

In order to analyze the spectrum of the sample contained in the cell CA, the procedure begins with a series of measurements performed under pulse conditions. The laser pulses generated by the source L1 serve equally well for generating and for detecting the terahertz radiation, as explained above with reference to FIG. 4. The delay line LR introduces a variable offset between the generating pulse and the detection pulse: by scanning through values for this offset, it is possible to reconstitute the time shape of the terahertz pulse received by the detector DE. A broadband and low resolution spectrum can thus be calculated by a Fourier transform.

This first stage serves to identify frequency ranges in which absorption lines are situated that can be used for characterizing the sample. Continuous spectroscopic measurements are then performed in these regions only, using the laser sources L2 and L3 to obtain high resolution spectra in these ranges only. During this second stage, the time offset introduced by the delay line LR can be kept unvarying.

In other words, a first stage of low resolution pulse spectroscopy serves to identify the "interesting" frequency ranges, after which high resolution acquisitions are performed in those ranges.

It will be understood that FIG. 9 represents merely one possible embodiment of a spectrometer of the invention. In a variant, it is possible to envisage using a single device both as transmitter and as receiver, with the terahertz radiation being reflected by a screen located behind the cell CA. Furthermore, during continuous measurements, radiation detection can be performed using a bolometer.

The invention claimed is:

1. An integrated antenna for transmitting or receiving radiation in a frequency range from 100 GHz to 3 THz, the antenna comprising:
  a conductive ground plane deposited on a top surface of a dielectric or semiconductor substrate;
  a conductive ribbon extending above said ground plane and forming an angle therewith, so as to form a radiating structure of the transverse electromagnetic wave horn type; and
  a planar waveguide comprising at least first and second conductive strips formed on said top surface of the substrate, and connected respectively to said conductive ribbon and to said conductive ground plane, wherein said conductive ribbon is electrically insulated from said conductive ground plane and has an end lying over said surface of said dielectric or semiconductor substrate.

2. An antenna according to claim 1, wherein the width of said conductive ribbon and its distance from said ground plane vary in a longitudinal direction, the ratio between said width and said distance being selected so as to achieve impedance matching between said planar waveguide and the radiating structure formed by the ribbon and the ground plane.

3. An antenna according to claim 2, wherein the ratio of the width of the conductive ribbon over its distance from the ground plane is maintained constant over at least a fraction of the length of said conductive ribbon.

4. An antenna according to claim 3, wherein the width of said conductive ribbon and its distance from said ground plane increase linearly along said longitudinal direction.

5. An antenna according to claim 4, wherein said conductive ribbon is substantially triangular in shape with a half-angle at the apex lying in the range 5° to 70°.

6. An antenna according to claim 1, wherein the angle between said conductive ribbon and said ground plane lies in the range 5° to 45°.

7. An antenna according to claim 1, wherein said planar waveguide also includes a third conductive strip also connected to said ground plane, the second and third conductive strips being disposed symmetrically on either side of said first conductive strip.

8. An antenna according to claim 1, wherein said conductive ribbon extending above said ground plane and forming an angle relative thereto presents a length lying in the range 100 µm to 10 mm.

9. An antenna according to claim 8, wherein said conductive ribbon presents a length lying in the range 500 µm to 5 mm.

10. An antenna according to claim 1, also including at least one spacer for holding said conductive ribbon spaced apart from said ground plane.

11. A terahertz transmitter comprising:
an antenna according to claim 1; and
at least one generator device for generating an electromagnetic signal at a frequency lying in the range 100 GHz to 3 THz, and integrated on the same dielectric or semiconductor substrate as the antenna;
the planar waveguide of the antenna being arranged to convey said electromagnetic signal from said at least one generator device to the radiating structure formed by the ribbon and the ground plane.

12. A terahertz spectrometer comprising:
a terahertz radiation transmitter according to claim 11, of the photoconduction type;
a terahertz radiation receiver, also of the photoconduction type, arranged to receive terahertz radiation generated by said transmitter after the radiation has passed through a region suitable for containing a sample for analysis;
a first laser source for generating pulses;
second and third laser sources for generating continuous radiation, at least one of them being tunable, the frequency difference between the radiation emitted by said second and third sources being capable of varying within a range from 100 GHz to 3 THz; and
an optical setup for selectively directing either the radiation emitted by said first laser source, or a superposition of the radiation emitted by said second and third laser sources onto photoconductive zones of said transmitter and receiver;
said optical setup including a delay line for introducing a variable time offset between the laser pulses emitted by said first source and directed to a photoconductive zone of said transmitter, and laser pulses likewise emitted by said first laser source and directed towards a photoconductive zone of said receiver.

13. A terahertz receiver comprising:
an antenna according to claim 1; and
at least one detector device for detecting an electromagnetic signal of frequency lying in the range 100 GHz to 3 THz, and integrated on the same dielectric or semiconductor substrate as the antenna;
the planar waveguide of the antenna being arranged to convey said electromagnetic signal from the radiating structure formed by the ribbon and the ground plane to said at least one detector device.

14. A method of fabricating an antenna, the method comprising the following steps:
fabricating a ground plane and a planar waveguide presenting at least two conductive strips, one of which is connected to said ground plane, by depositing a first layer of metallization on a top surface of a dielectric or semiconductor substrate;
depositing a sacrificial layer on said ground plane;
fabricating a conductive ribbon connected to at least one other conductive strip of said waveguide by depositing a second layer of metallization on said sacrificial layer;
etching said sacrificial layer to release said conductive ribbon and
lifting said conductive ribbon.

15. A method according to claim 14, also including, prior to depositing said second layer of metallization, a step of making openings in said sacrificial layer to enable electrical and mechanical connections to be made between the conductive ribbon and said other conductive strip of said planar waveguide.

16. A method according to claim 14, wherein said second layer of metallization forming said conductive ribbon presents thickness lying in the range 0.1 µm to 50 µm.

17. A method according to claim 14, also including a step of fabricating a spacer to hold said conductive ribbon spaced apart from said ground plane.

18. A method according to claim 17, wherein said step of fabricating a spacer comprises depositing a droplet of wax in the liquid state between the conductive ribbon and the ground plane, and then hardening it.

19. A method according to claim 14, also including a step of integrating on said dielectric or semiconductor substrate a device for generating and/or detecting an electromagnetic signal of frequency lying in the range 100 GHz to 3 THz, said device being connected to the radiating structure formed by the ribbon and the ground plane by said planar waveguide.

* * * * *